(12) United States Patent
Matoba

(10) Patent No.: US 8,655,140 B2
(45) Date of Patent: *Feb. 18, 2014

(54) DATA CONVERSION METHOD AND DATA CONVERSION DEVICE, DATA RECORDING DEVICE, DATA PLAYING DEVICE, AND COMPUTER PROGRAM

(75) Inventor: Kazuki Matoba, Tokyo (JP)

(73) Assignee: Sony Corporation, Tokyo (JP)

( * ) Notice: Subject to any disclaimer, the term of this patent is extended or adjusted under 35 U.S.C. 154(b) by 908 days.

This patent is subject to a terminal disclaimer.

(21) Appl. No.: 12/241,295

(22) Filed: Sep. 30, 2008

(65) Prior Publication Data

US 2009/0110376 A1    Apr. 30, 2009

(30) Foreign Application Priority Data

Oct. 25, 2007    (JP) .................................. 2007-277939

(51) Int. Cl.
*H04N 5/775* (2006.01)
*H04N 7/12* (2006.01)

(52) U.S. Cl.
USPC ..................................... 386/232; 375/240.01

(58) Field of Classification Search
USPC ............................. 386/131, 232; 375/240.01
See application file for complete search history.

(56) References Cited

U.S. PATENT DOCUMENTS

| 2004/0136688 | A1* | 7/2004 | Searby | ............................. 386/52 |
|---|---|---|---|---|
| 2004/0240851 | A1 | 12/2004 | Togita | |
| 2005/0117880 | A1 | 6/2005 | Seo et al. | |
| 2005/0256967 | A1* | 11/2005 | Winter | ........................... 709/231 |
| 2006/0203920 | A1 | 9/2006 | Yongfang et al. | |
| 2007/0081669 | A1 | 4/2007 | Takashima et al. | |
| 2007/0292107 | A1* | 12/2007 | Yahata et al. | .................... 386/68 |
| 2008/0019671 | A1* | 1/2008 | Marumori | ...................... 386/124 |
| 2008/0310498 | A1* | 12/2008 | Marumori | ................ 375/240.01 |
| 2009/0003172 | A1* | 1/2009 | Yahata et al. | .............. 369/53.41 |

FOREIGN PATENT DOCUMENTS

| EP | 1 316 960 A1 | 6/2003 |
|---|---|---|
| EP | 1 585 128 A1 | 10/2005 |
| JP | 2006-319954 | 11/2006 |
| JP | 2007-200518 | 8/2007 |

(Continued)

OTHER PUBLICATIONS

Douglas Dixon, "Ulead DVD MovieFactory 6", Manifest Technology, [Online], XP002506651, Retrieved from the Internet: URL:http://manifest-tech.com/media_dvd/dvd_ulead_dvdmf6.htm>, 6 Pages.

*Primary Examiner* — Carl Colin
*Assistant Examiner* — S. Ali Zaidi
(74) *Attorney, Agent, or Firm* — Oblon, Spivak, McClelland, Maier & Neustadt, L.L.P.

(57) ABSTRACT

A data conversion method for an information processing device to generate data for copying of defined format data of a clip including playback segment data includes the steps of: performing data input for a data input unit to input copy source data; obtaining copy source clip configuration data including streaming data to be copied from the copy source by a clip adjusting unit; and clip setting for the clip adjusting unit to set one clip including multiple copy source clip configuration data corresponding to a play item in the playlist file defined with a copy source format, as a copy destination clip.

17 Claims, 15 Drawing Sheets

(56) References Cited

FOREIGN PATENT DOCUMENTS

| | | |
|---|---|---|
| JP | 2007-334945 | 12/2007 |
| JP | 2008-27474 | 2/2008 |
| JP | 2008-311871 | 12/2008 |
| WO | WO 2004/047098 A1 | 6/2004 |
| WO | WO 2007/117016 A1 | 10/2007 |

* cited by examiner

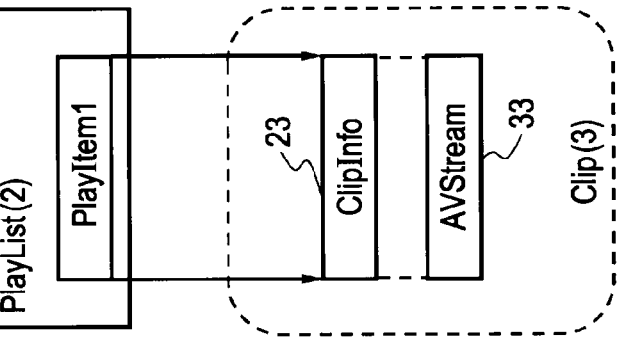
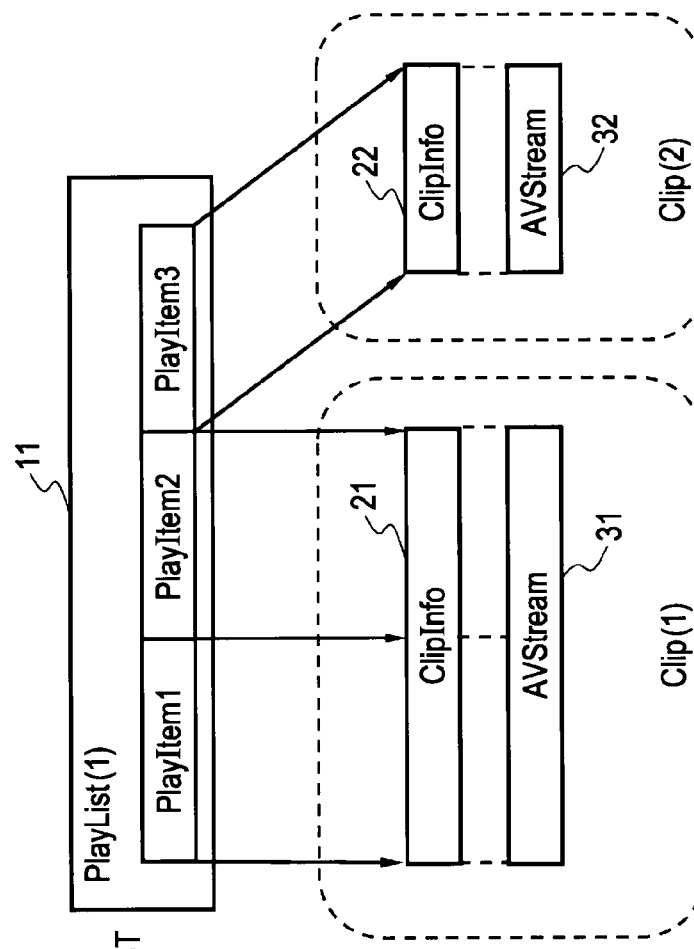
FIG. 1A PLAYLIST
FIG. 1B CLIP

FIG. 2A DUBBING SOURCE
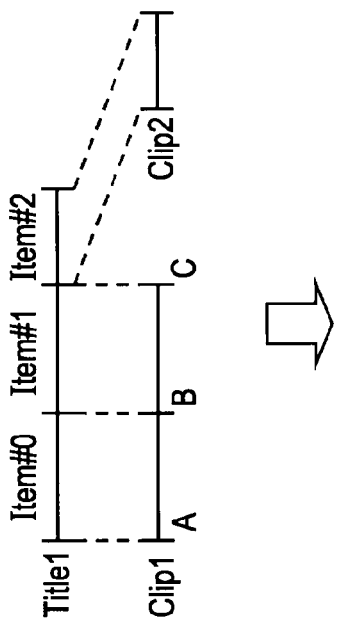
FIG. 2B DUBBING DESTINATION
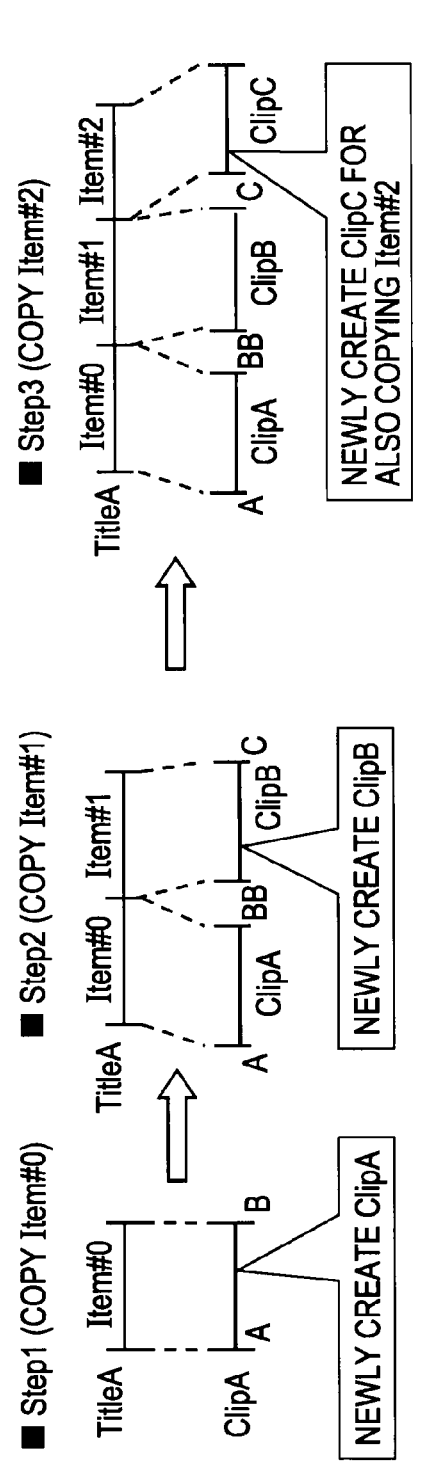
■ DUBBING SOURCE HAS 2 Clips BUT WITH DUBBING DESTINATION Clip INCREASES TO 3

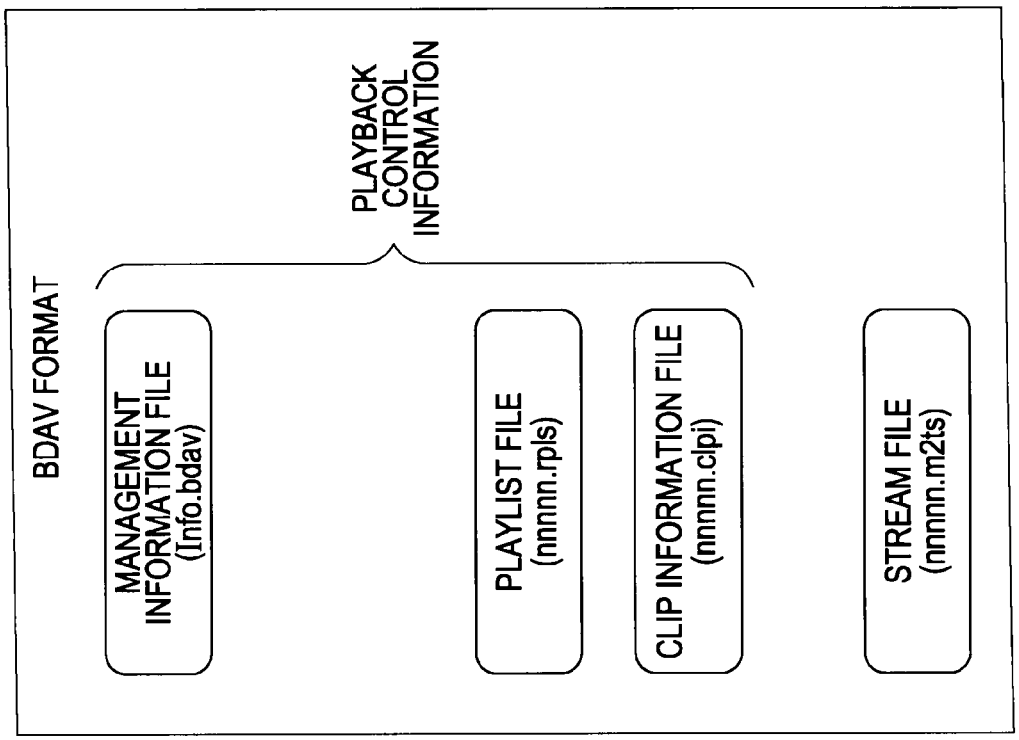
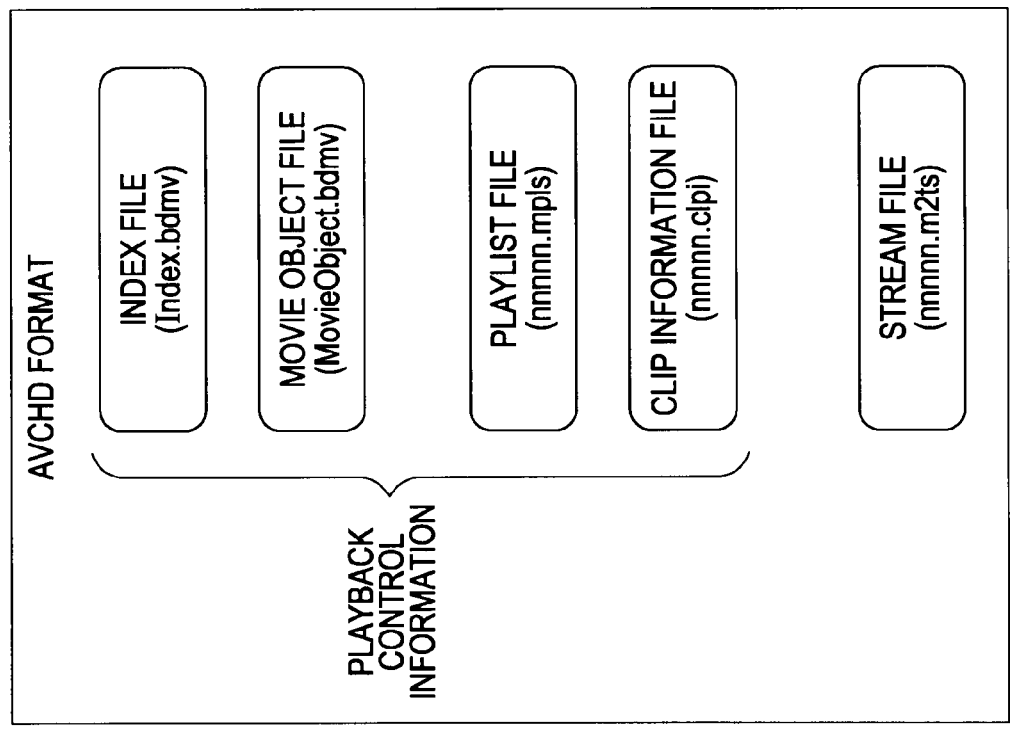

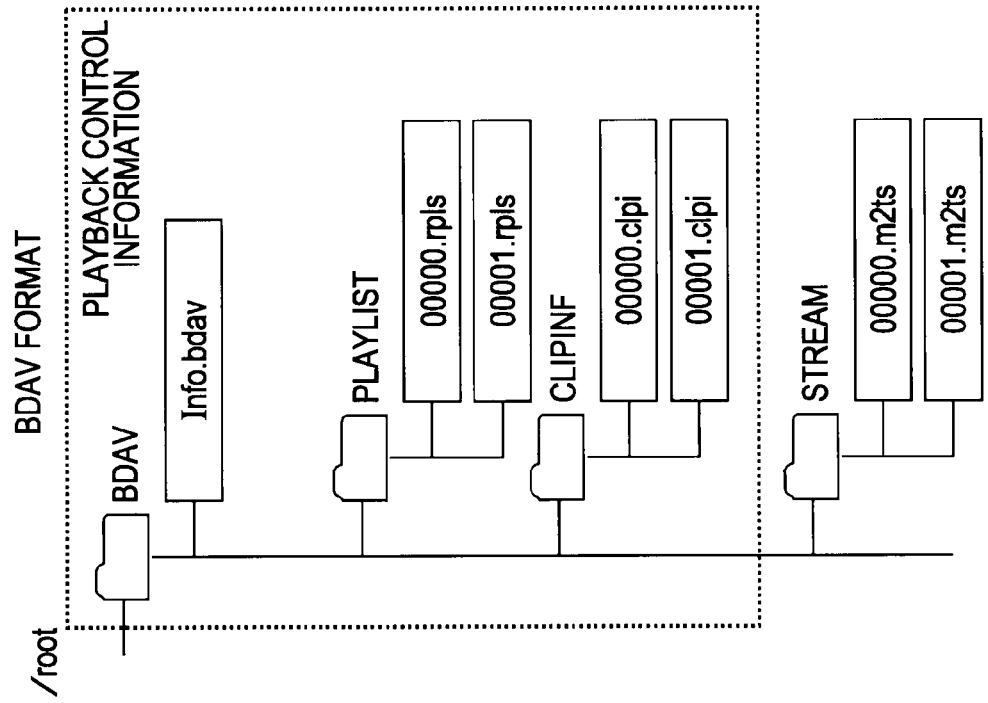
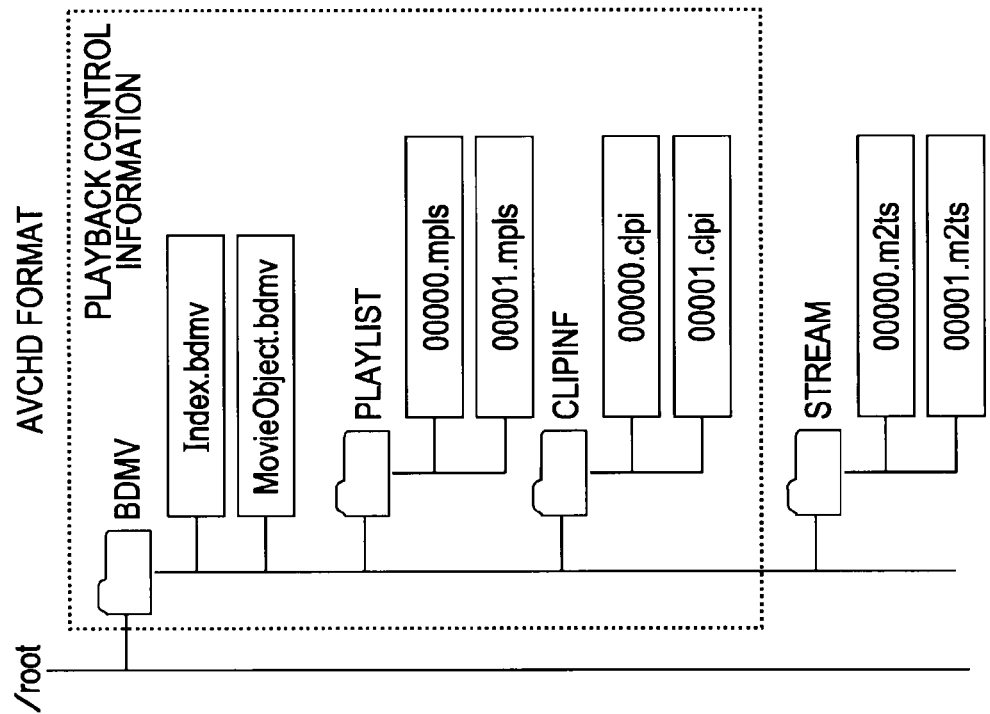

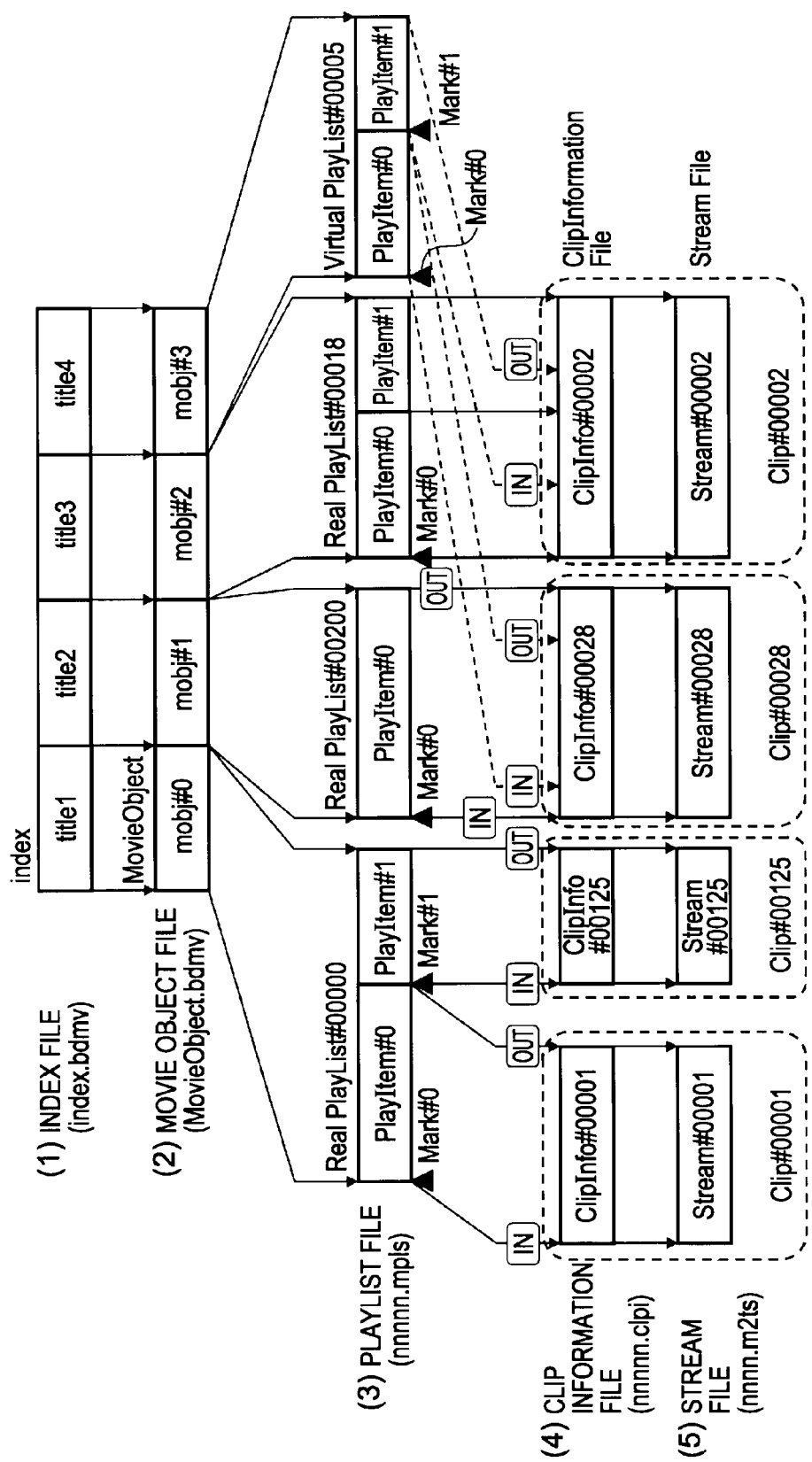

(1) MANAGEMENT INFORMATION FILE
(Info.bdav)

(2) PLAYLIST FILE
(nnnn.rpls)

(3) CLIP INFORMATION FILE
(nnnnn.clpi)

(4) STREAM FILE
(nnnnn.m2ts)

FIG. 12A  DUBBING SOURCE
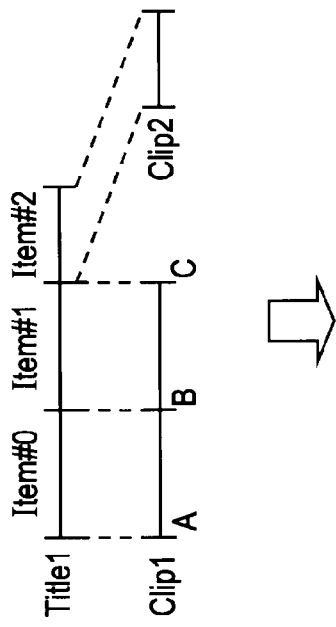
FIG. 12B  DUBBING DESTINATION
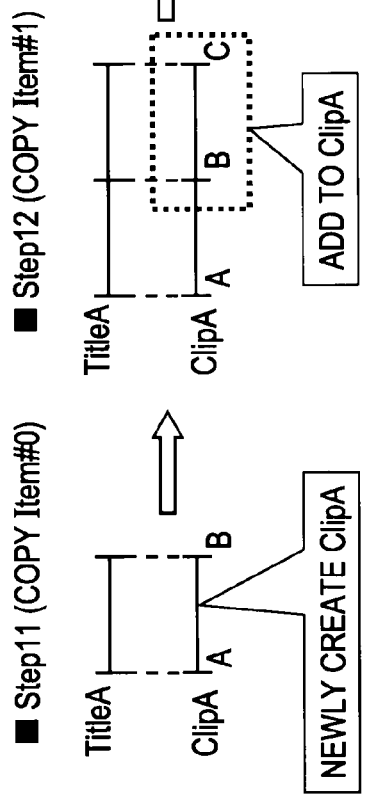
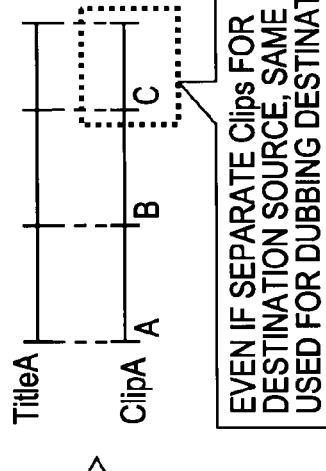

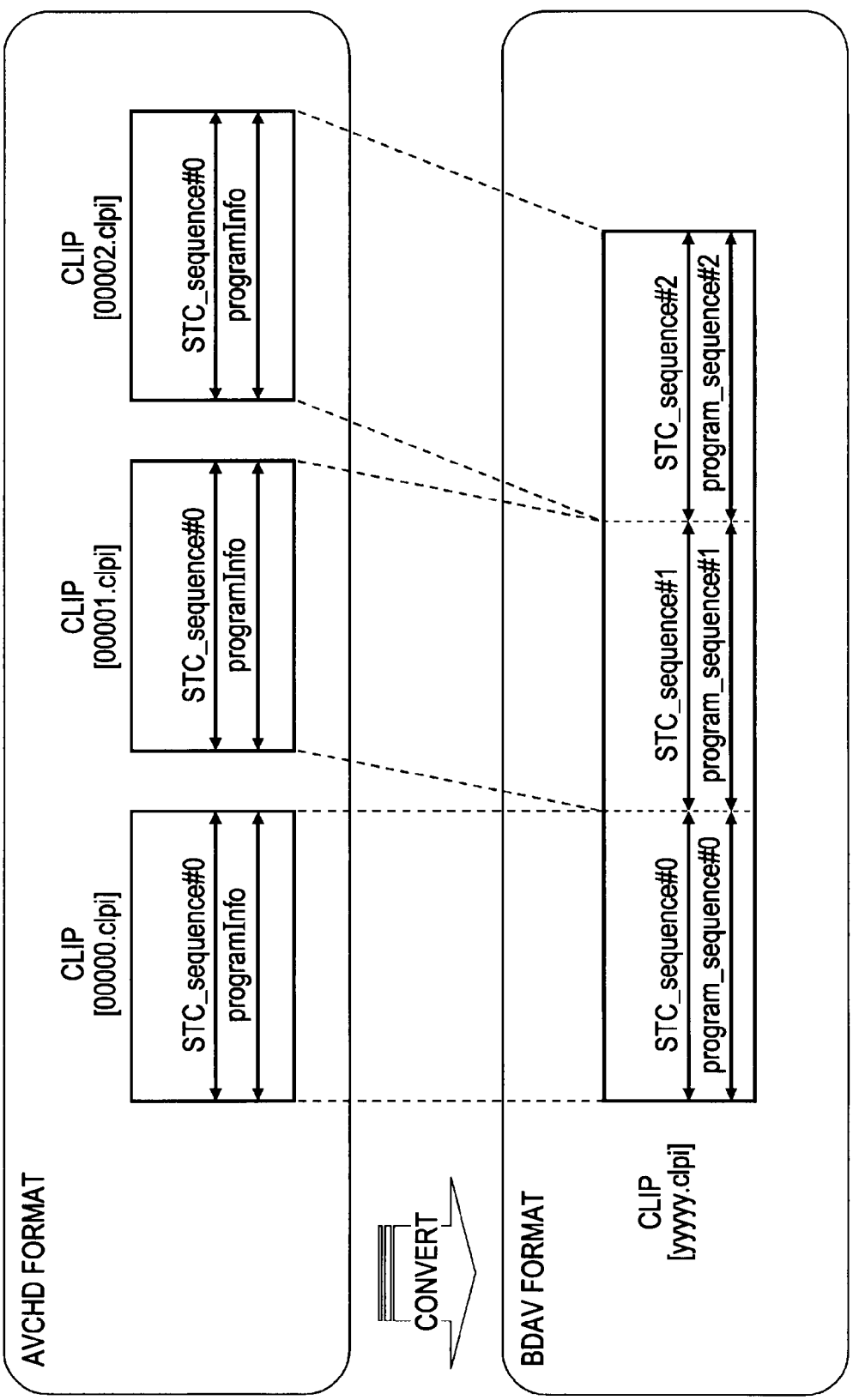

DATA CONVERSION METHOD AND DATA CONVERSION DEVICE, DATA RECORDING DEVICE, DATA PLAYING DEVICE, AND COMPUTER PROGRAM

CROSS REFERENCES TO RELATED APPLICATIONS

The present invention contains subject matter related to Japanese Patent Application JP 2007-277939 filed in the Japanese Patent Office on Oct. 25, 2007, the entire contents of which are incorporated herein by reference.

BACKGROUND OF THE INVENTION

1. Field of the Invention

The present invention relates to a data conversion method and data conversion device, data recording device, data playing device, and computer program. In particular, the present invention relates to a data conversion method and data conversion device, data recording device, data playing device, and computer program arranged to perform processing to combine (merge) clips included in various types of format data such as AVCHD format and BDAV format data and set multiple clips into one clip.

2. Description of the Related Art

AVCHD (Advanced Video Codec High Definition) is related art regarding a data recording format for a video camera.

In the processing for recording a moving image stream photographed with a video camera to media according to AVCHD format, the photographed moving image data is encoded as a MPEG4-AVC stream (e.g. H.264/AVC stream), while the files of index (index), movie object (MovieObject), playlist (PlayList), clip information (ClipInformation), and stream (Stream) are generated and recorded in media such as a hard disk or flash memory. Note that specific format configurations will be described later.

On the other hand, Blu-ray Disc (registered trademark) is related art with regard to a recording medium that can record high density data. Hereafter, Blu-ray Disc (registered trademark) will be called "BD". BDAV (Blu-ray Disk Audio Visual) format (BD-RE2.1) is a data recording format corresponding to a rewritable disk permitted data re-recording with BD.

With data recording according to BDAV format (BD-RE2.1), a stream wherein moving image data is recorded in an MPEG2-TS stream or MPEG4-AVC stream (e.g. H.264/AVC stream), as well as playback control information files such as management information (Info), playlists (Playlist), and clip information (ClipInformation) are recorded onto media. BDAV format is described in Japanese Unexamined Patent Application Publication No. 2006-319954.

With either of the AVCHD format or BDAV format, a data pair of a stream (Stream) file wherein moving image data is stored and a clip information (ClipInformation) file wherein the attribute information of the stream file thereof is stored is called a clip. FIG. 1 shows a clip configuration example. In the example shown in FIG. 1, clip information file 21 and AV stream file 31 are shown as [clip 1 (Clip1)], clip information file 22 and AV stream file 32 are shown as [clip 2 (Clip2)], and clip information file 23 and AV stream file 33 are shown as [clip 1 (Clip3)].

In the case of performing clip playback, a play item configured in the playlist file is used. A play item is used to specify a playback increment of the AV stream, and an upper-level index of the playlist file or management information is used to select a specific play item according to a title specified by the user, a specific playback segment within the clip is specified by the selected play item, and playback processing is executed using the clip information file and AV stream file corresponding to the playback segment.

Note that the play list is one playback sequence that can be specified by the user, and is made up of one or more play items. FIG. 1 shows two playlists 11 and 12. With the example shown in FIG. 1, the playlist 11 is made up of 3 play items, and playlist 12 is made up of one play item.

A processing example will be described in the case of copying (dubbing) data recorded onto media with a certain format onto another media, with reference to FIG. 2. FIG. 2A shows the correlation between the play item and clip in the dubbing source (copy source) media, and FIG. 2B shows the correlation between the play item and clip in the dubbing destination (copy destination) media.

The example shown in FIG. 2A is an example in the case of dubbing (copying) two clips of clip 1 (Clip1) and clip 2 (Clip2) recorded on the dubbing source (copy source) media to other media. With general copy processing up to this point, copy processing is executed in increments of play items (Item shown in FIG. 2), and in this event, copy processing with clip set is performed in play item increments serving as copy increments.

In the example shown in FIG. 2, the copy processing is performed in the order of steps 1 through 3 shown in FIG. 2B. First, in step 1, the play item #0 (Item #0) of the dubbing source and a partial segment (AB) of the clip 1 correlating to the play item #0 (Item #0) are read out, and the clip segment AB is set and recorded as one clip A (ClipA) independent in the media of the dubbing destination (copy destination).

Next, in step 2, the play item #1 (Item #1) of the dubbing source and a partial segment (BC) of the clip 1 correlating to the play item #1 (Item #1) are read out, and the clip segment BC is set and recorded as one clip B (ClipB) independent in the media of the dubbing destination (copy destination).

Next, in step 3, the play item #2 (Item #2) of the dubbing source and a clip 2 correlating to the play item #2 (Item #2) are read out, and the clip 2 is set and recorded as one clip C (ClipC) independent in the media of the dubbing destination (copy destination).

Thus, with general copy processing according to related art of format data regulating clips, clips are read out in increments of play items within the playlist file of the dubbing source, clips in increments of play items are created and recorded in the media of the dubbing destination. Consequently, the number of clips in the media of the dubbing destination become a number greater than the number of clips in the dubbing source. In the example shown in FIG. 2, the number of clips in the dubbing source=2 and the number of clips in the dubbing destination=3.

SUMMARY OF THE INVENTION

However, with either the above-described AVCHD format and BDAV format, and the number clips recordable onto one media is stipulated with each format. Specifically, the upper limit of number of clips recordable onto one recording media with AVCHD format is restricted to 4000, and the upper limit of number of clips recordable onto one recording media with BDAV format is restricted to 200.

Accordingly, when copy processing which accompanies an increase in number of clips as described above with reference to FIG. 2 is executed, the number of clips stipulated by format becomes more likely to reach the upper limit of number of clips, after which there is a problem that data cannot be copied to the media thereof.

It has been found desire able to provide, with regard to a case of copy processing of the clip defined format data as with AVCHD format or BDAV format for example, a data conversion method enabling recording processing by preventing increase to the number of clips or decreasing the number of clips, and a data converting device, data recording device, data playback device, and computer program.

According to an embodiment of the present invention, a data conversion method for an information processing device is a data conversion method to execute copy processing of defined format data of a clip including playback segment data including the steps of: data input for a data input unit to input copy source data; obtaining copy source clip configuration data including streaming data to be copied from the copy source by a clip adjusting unit; and clip setting for the clip adjusting unit to set one clip including multiple copy source clip configuration data corresponding to a play item in the playlist file defined with a copy source format, as a copy destination clip.

The data conversion method may further include a step of performing data recording for a data recording unit to record data including the copy destination clips set with the clip setting onto media.

The clip setting may include a step of executing processing to set one copy destination clip including multiple copy source clip configuration data in the case that multiple copy source clip configuration data are clip configuration data corresponding to play items included in the same playlist file in copy source format.

Even in the case that the plurality of copy source clip configuration data is set as clip configuration data which is different in the copy source format, the clip setting may set one copy destination clip including the plurality of copy source clip configuration data in the case that the plurality of copy source clip configuration data are clip configuration data corresponding to the play items included in the same playlist file in copy source format.

The clip defined format data may be either AVCHD (Advanced Video Codec High Definition) format data or BDAV (Blu-ray Disc Audio Visual) format data.

The clip adjusting unit may further include a step of: performing format conversion with the clip adjusting unit so as to perform format conversion for the copy source data, and generate format data serving as recorded data which differs from the copy source data.

The format conversion may include a step of executing processing to execute format conversion processing from AVCHD (Advanced Video Codec High Definition) format into BDAV (Blu-ray Disc Audio Visual) format.

The format conversion may include a step of executing processing to select an index file, a playlist file, and a clip information file as a playback control information file included in the AVCHD format to be converted, and generate a management information file, playlist file, and clip information file according to the BDAV format by format conversion of the selected file.

The format conversion may include a step of setting new identifiers for the BDAV format data without using the identifiers in the AVCHD format data, regarding a clip information file identifier, play item identifier, and STC identifier.

According to an embodiment of the present invention, a data converting device configured to generate data for copying of the clip defined format data including playback segment data including: a data input unit to input copy source data; and a clip adjusting unit configured to obtain copy source clip configuration data including streaming data subject to copying from the copy source data; and to set one clip including multiple copy source clip configuration data corresponding to the play items in the playlist file defined in the copy source format, as a copy destination clip.

According to an embodiment of the present invention, a data recording device configured to execute copy recording processing of the clip defined format data including playback segment data includes: a data input unit to input copy source data; a clip adjusting unit configured to obtain copy source clip configuration data including streaming data subject to copying from the copy source data and to set one clip including multiple copy source clip configuration data corresponding to the play items in the playlist file defined in the copy source format; and a data recording unit configured to record data including the copy destination clip set in the clip setting step onto media.

According to an embodiment of the present invention, a data playback device configured to play back the clip defined format data including the playback segment data from the media and outputting the data to be copied, includes: a data playback unit to execute data playback from the media wherein the clip defined format data is recorded; a clip adjusting unit configured to obtain copy source clip configuration data including streaming data subject to copying from the playback data of the data playback unit and to set one clip including multiple copy source clip configuration data corresponding to the play items in the playlist file defined in the copy source format; and a data output unit configured to output data including the copy destination clip set in the clip setting step onto media as data for copying.

According to an embodiment of the present invention, a computer program with an information processing device to cause execution of copy processing of clip defined format data including playback segment data, includes the steps of: performing data input to input copy source data in a data input unit; obtaining copy source clip configuration data including the streaming data subject to copying from the copy source data, with a clip adjusting unit; setting clips so as to set one clip including a plurality of copy source clip configuration data corresponding to play items within the playlist file defined with the copy source format, with the clip adjusting unit; and recording data including the copy destination clip set with the clip setting onto media with a data recording unit.

Note that the computer program according to the present invention is a computer program which can provide various program codes in a computer readable format as to a general-purpose computer system which can execute the program codes, with a storage medium and communication medium, for example. By providing such a program in a computer-readable format, processing according to the program is realized on the computer system.

Other objectives, features, and advantages of the present invention will become clear through the detailed description based on the later-described embodiments of the present invention and appended drawings. Note that the term "system" as used in the present specification the present specification refers to a theoretical collective configuration of multiple devices, and is not limited to devices of various configurations which are housed in the same casing.

According to the above configurations, with an arrangement to generate data for copying of clip defined format data including playback segment data, clip adjusting processing is performed by obtaining copy source clip configuration data including streaming data subject to copying, and setting one clip including multiple copy source clip configuration data corresponding to the play items set in the playlist file in the copy source format, as a copy destination clip. With the present configuration, copy recording can be performed without increasing the number of copy destination clips to be larger than the number of copy source clips. Accordingly, various types of formats wherein the upper limit of number of clips recordable onto media is stipulated, e.g. in the event of copy recording processing with AVCHD format or BDAV format, recording a large amount of data without exceeding the upper limit of number of clips stipulated by the format is enabled.

BRIEF DESCRIPTION OF THE DRAWINGS

FIGS. 1A and 1B are diagrams to describe a format with stipulated clips;

FIGS. 2A and 2B are diagrams to describe a copy processing example of format data with stipulated clips;

FIGS. 5A and 5B are diagrams to describe AVCHD format and BD format;

FIGS. 6A and 6B are diagrams to describe a directory configuration of the AVCHD format and BDAV format;

FIG. 7 is a diagram to describe the correlation between files set with the AVCHD format;

FIGS. 12A and 12B are diagrams to describe a specific example of the clip adjusting processing according to an embodiment of the present invention;

FIG. 15 is a diagram describing a resetting processing example for each identifier with the format conversion processing according to an embodiment of the present invention.

DESCRIPTION OF THE PREFERRED EMBODIMENTS

Figure 3:
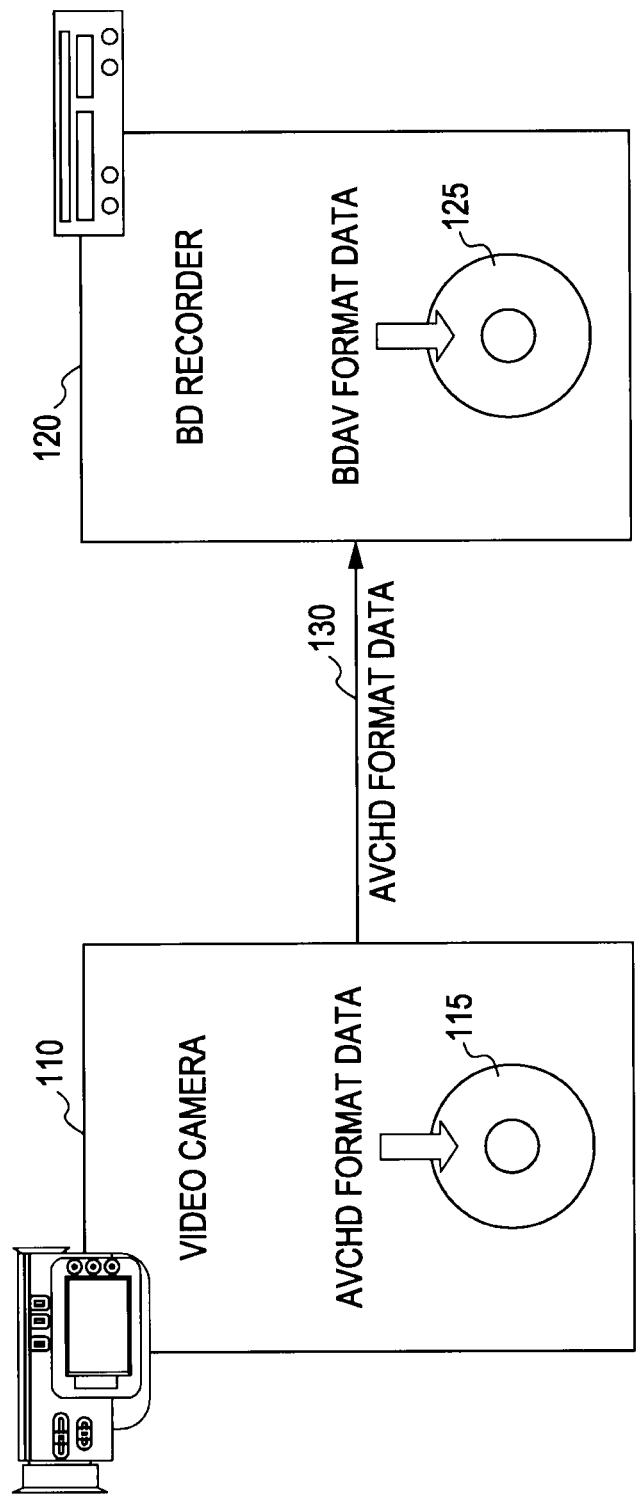
FIG. 3 is a block diagram to describe an overview of the configuration and processing according to an embodiment of the present invention.

A data conversion method and data conversion device, data recording device, data playing device, and computer program according to the present invention will be described in detail with reference to the drawings below.

The present invention enables preventing an increase to the number of clips or reducing the number of clips in the event of copy (dubbing) processing of clip defined format data made up of a data pair of an AV stream and clip information file in AVCHD (Advanced Video codec High Definition) format which is used as a data recording format with a video camera and BDAV (Blu-ray Disc Audio Visual) format which is a data recording format for BD[Blu-ray Disk (registered trademark)], for example.

Note that in the event of copy processing, the present invention is applicable to not only a case wherein the copy source and copy destination are the same format data, e.g. in a case of copying BDAV format data as BDAV format data or in a case of copying AVCHD format data as AVCHD format data, but also in a case that the copy source and copy destination are different format data, i.e. format conversion is executed at the time of copy processing.

For example, the present invention is applicable in a case of converting format data which differs between copy source and copy destination, e.g. converting AVCHD format data into BD format data and performing copying.

That is to say, the present invention is applicable to all of the cases described below, i.e.

(a) in the case of recording when the copy source and copy destination are both the same format data, e.g. in the case of reading BD format data from the copy source and recording this as BD format data at the copy destination;

(b) in the case of recording when the copy source and copy destination are both the same format data, e.g. in the case of reading AVCHD format data from the copy source and recording this as AVCHD format data at the copy destination; and (c) in the case of executing format conversion where the copy source and copy destination have difference format data, e.g. AVCHD format data and BD format data, and performing copying.

Further, the present invention is applicable in the case of changing formats between multiple different format, such as between AVCHD formats or between BD formats, e.g. between BD-RE3.0 format and BD-RE-2.1 format.

As described above, the upper limit of number of clips recordable in one recording media with AVCHD format is restricted to 4000, and the upper limit of number of clips recordable in one recording media with BDAV format is restricted to 200. Accordingly, in the case that the copy source media is AVCHD format data, and the AVCHD format data is subjected to format conversion and converted to BD format data and recorded in the copy destination media, there is the problem that only 200 clips can be recorded in the copy destination media, whereby recordable data significantly decreases if the number of clips is not reduced.

However, in the case of performing copying between media by adjusting the number of clips according to the present invention and converting the AVCHD format data into BD format data, the probability of number of clips in BD format reaching the upper limit (200) is decreased, enabling more data copying.

With the embodiment described below, a copy processing example will be described wherein the copy source media recording data is data recorded in AVCHD format, the AVCHD format data is read out and format conversion accompanying clip setting processing is executed, whereby BD format data is generated and the data is recorded as BD format data in the copy destination media. Note that as described above, the present invention is also applicable for copy processing without accompanying format conversion.

A configuration example of executing processing according to the present invention will be described with reference to FIG. 3. As shown in FIG. 3, an image shot with a video camera 110 is recorded on media 115 in AVCHD format. The AVCHD format data recorded on the recording media 115 is output to a BD recorder 120 via a USB cable 130, for example, whereby format conversion accompanying the clip adjusting processing from the AVCHD format to the BVAD format is executed with the BD recorder 120, and the data is recorded on a recording media 125.

The BD recorder is a recorder which can playback the recorded data according to the BDAV format, and the video photography image recorded on the recording media 125 by the format conversion can be played back with the BD recorder 120 by the format conversion.

Figure 4A:
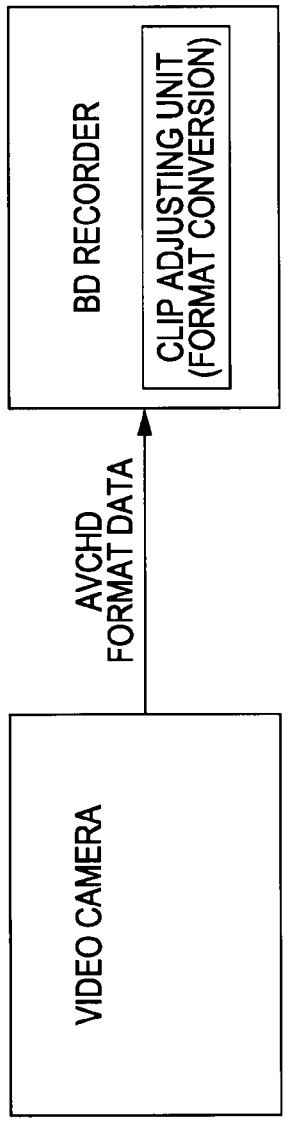
FIGS. 4A through 4C are diagrams to describe a configuration example to execute the processing according to the present invention.
Figure 4B:
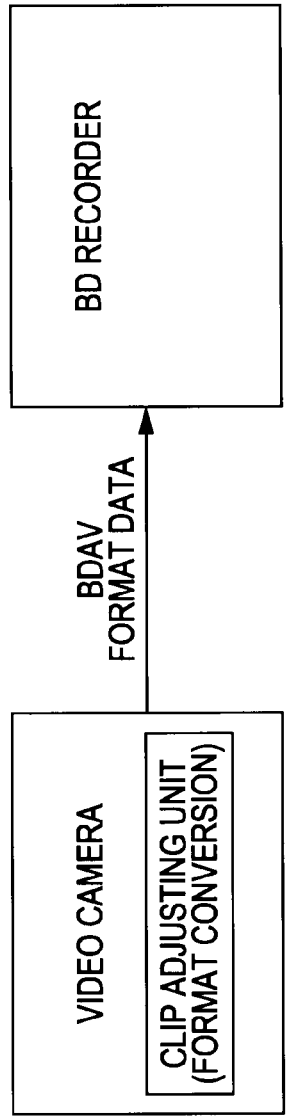
Figure 4C:
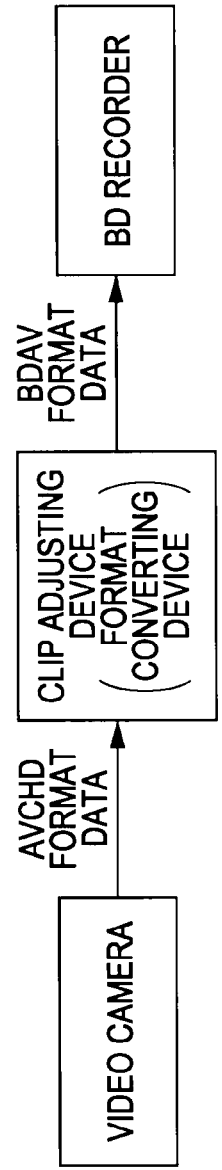

Note that with the example shown in FIG. 3, the device to execute format conversion accompanying clip adjusting processing is a BD recorder 120, and the embodiments described hereafter also will describe a configuration example for the BD recorder 120 to perform format conversion which accompanies clip adjusting processing, but for example as shown in FIG. 4, various settings can be used for setting states for the clip adjusting unit.

(a) A configuration to set the clip adjusting unit (execute along with format conversion with the present embodiment) on the recording device side;
(b) a configuration to set the clip adjusting unit (execute along with format conversion with the present embodiment) on the recording device side; and
(c) a configuration to set the clip adjusting unit (execute along with format conversion with the present embodiment) independently.

Any of these configurations may be made, and the clip adjusting processing relating to the present invention can be executed with various devices.

Next, an overview of AVCHD format and BDAV format will be described with reference to FIG. 5 and on. FIG. 5 shows
(A) a file set with AVCHD format, and
(B) a file set with BDAV format (BD-RE2.1).

With both the AVCHD format and BDAV format, the content actual portion such as photographed data is stored in a stream file (nnnnn.m2ts). The stream file itself is for example a MPEG4-AVC stream (e.g. H.264/AVC stream) encoded data, and is data of the same format.

Further, as playback control information other than the content actual data, with the (A) AVCHD format, a (1) index (index.bdmv) file, (2) movie object (MovieObject.bdmv) file, (3) playlist (PlayList) file, and (4) clip information (ClipInformation) file are recorded, and with the (B) BDAV format (BD-RE2.1), the data of a (1) management information (info.bdav) file, (2) playlist (PlayList) file, and (3) clip information (ClipInformation) file are recorded. The playback control information in the AVCHD format and the playback control information in the BDAV format are similar data, but are not the same.

A directory configuration corresponding to each format is shown in FIG. 6. FIG. 6 shows a director configuration for both formats of a (A) directory configuration in AVCHD format and (B) directory configuration in BDAV format (BD-RE2.1). As shown in the directory configuration, multiple playlist files, clip information lies, and stream files are set.

The directory configuration of the (A) AVCHD format will be described. Only the two index file [Index.bdmv] and movie object file [MovieObject.bdmv] can be placed directly below the directory [BDMV]. Also, below the BDMV directory [BDMV] a playlist directory [PLAYLIST], clip information directory [CLIPINF], and stream directory [STREAM] are placed.

The index file [Index.bdmv] has description of the content in the directory BDMV. Also, the movie object file [MovieObject.bdmv] has one or more movie object information stored therein.

The playlist directory [PLAYLIST] includes a playlist file [nnnnn.mpls] which is a file relating to a movie playlist. The playlist file [nnnnn.mpls] is a file created as to each of the movie playlists. In the file name, the [nnnnn] before the [.] (period) is a 5-digit number, and the [mpls] after the period is an extension which is fixed for this type of file.

The clip information directory [CLIPINF] includes the clip information file [nnnnn.clpi] as to each of the AV stream files. In the file name, the [nnnnn] before the [.] (period) is a 5-digit number, and the [clip] after the period is an extension which is fixed for this type of file.

The stream directory [STREAM] is a directory wherein an actual AV stream file is placed. That is to say, the stream directory [STREAM] includes an AV stream file corresponding to each of the clip information files. The AV stream file is made up of a MPEG4-AVC (e.g. H.264/AVC) transport stream (AVC-TS), and the file name is [nnnnn.m2ts]. In the file name, the [nnnnn] before the period is the same as the corresponding clip information file, whereby the correlation between the clip information file and the clip AV stream file can be readily understood.

Next, the directory configuration of the (B) BDAV format will be described. The management information file [index.bdav] is placed directly below the directory [BDAV]. Also, below the BDAV directory [BDAV] a playlist directory [PLAYLIST], clip information directory [CLIPINF], and stream directory [STREAM] are placed.

The management information file [info.bdav] has description of the content in the directory BDAV.

The playlist directory [PLAYLIST] includes a playlist file [nnnnn.rpls] which is a file relating to a movie playlist. The playlist file [nnnnn.rpls] is a file created as to each of the movie playlists. In the file name, the [nnnnn] before the [.] (period) is a 5-digit number, and the [rpls] after the period is an extension which is fixed for this type of file.

The clip information directory [CLIPINF] includes the clip information file [nnnnn.clpi] as to each of the AV stream files. In the file name, the [nnnnn] before the [.] (period) is a 5-digit number, and the [clip] after the period is an extension which is fixed for this type of file.

The stream directory [STREAM] is a directory wherein an actual AV stream file is placed. That is to say, the stream directory [STREAM] includes an AV stream file corresponding to each of the clip information files. The AV stream file is made up of a transport stream (MPEG2-TS or AVC-TS) such as MPEG2 (Moving Pictures Experts Group 2) or MPEG4-AVC stream (e.g. H.264/AVC stream), and the file name is [nnnnn.m2ts]. In the file name, the [nnnnn] before the period is the same as the corresponding clip information file, whereby the correlation between the clip information file and the clip AV stream file can be readily understood.

The role of each file in AVCHD format and BDAV format will be described with reference to FIGS. 7 and 8.

FIG. 7 is a diagram to describe data recording configuration according to AVCHD format. With the data recording processing according to AVCHD format, each of a (1) index (Index) file, (2) movie object (MovieObject) file, (3) playlist (PlayList) file, (4) clip information (ClipInformation) file, and (5) stream (AVStream) file, are generated and recorded. The details of each file will be described below.

(1) An index (Index) file is a management file that manages the entire media, and is a file to manage a title to show the user which the user can specify at the time of playing back the content and manage the correlation of the MovieObject equivalent to a playback program.

(2) A movie object (MovieObject) file is a file equivalent to a playback program, and is a file used according to the title selected by the user, to specify a playlist used for playback.

(3) A playlist (PlayList) file is made up of at least one or more play items. Each play item has a playback start point (In point) and a playback end point (OUT point) as to the clip, thereby specifying the playback segment thereof. By lining of multiple play items on a temporal axis in the playlist, the playback sequence of each playback segment can be specified. Note that a mark (Mark) showing a certain temporal position of the playback content is set in the playlist file. Generally the space between marks is called a chapter.

Note that a playlist may be a real playlist or a virtual playlist. A real playlist is a playlist for an original title, and pictures recorded/played back are registered in the recorded order. A virtual playlist is a playlist to create a user defined playback list by editing.

(4) A clip information (ClipInformation) file has information relating to a stream necessary for playing back an actual stream described therein, and is a file that corresponds one-to-one with the AV stream and defines the attributes with the corresponding AV stream. For example, coding, size, time-to-address conversion, playback management information, time map and so for the are included therein.

(5) A stream (AVStream) file is a file wherein a MPEG4-AVC stream (e.g. H.264/AVC stream) generated from moving image data photographed with a video camera is stored.

Note that a set of one clip information (ClipInformation) file and a stream file specified by such clip information (ClipInformation) file is called a clip [Clip]. In the example shown in the diagram, Clip #00001, Clip #00125, Clip #00028, and Clip #00002 are shown.

Next, the data recording configuration according to the BDAV format will be described with reference to FIG. 8. With the recording processing according to the BDAV format, each file of (1) management information (Info) file, (2) playlist (PlayList) file, (3) clip information (ClipInformation) file, and (4) stream (AVStream) file are generated and recorded.

The details of each file will be described.

(1) A management information (Info) file is a file corresponding to the index (Index) file in the AVCHD format, and manages the title to show to the user. However, no MovieObject file exists in the BDAV format, whereby the management information (Info) file is used according to the title selected by the user, and specifies the playlist used for playback.

(2) A playlist (PlayList) file corresponds to the playlist (PlayList) file in the AVCHD format, and is made up of at least one or more play items.

(3) A clip information (ClipInformation) file corresponds to the clip information (ClipInformation) file in the AVCHD format, and information relating to a stream necessary for playing back an actual stream is described therein.

(4) A stream (AVStream) file is the same as the stream (AVStream) file in the AVCHD format, and is a file wherein an MPEG2-TS or MPEG4-AVC stream (e.g. H.264/AVC stream) generated from the moving image data is stored.

Note that similar to the AVCHD format, with the BDAV format also a set of one clip information (ClipInformation) file and a stream file specified by such clip information (ClipInformation) file is called a clip [Clip]. In the example shown in the diagram, Clip #00001, Clip #00002, and Clip #00003 are shown.

Figure 8:
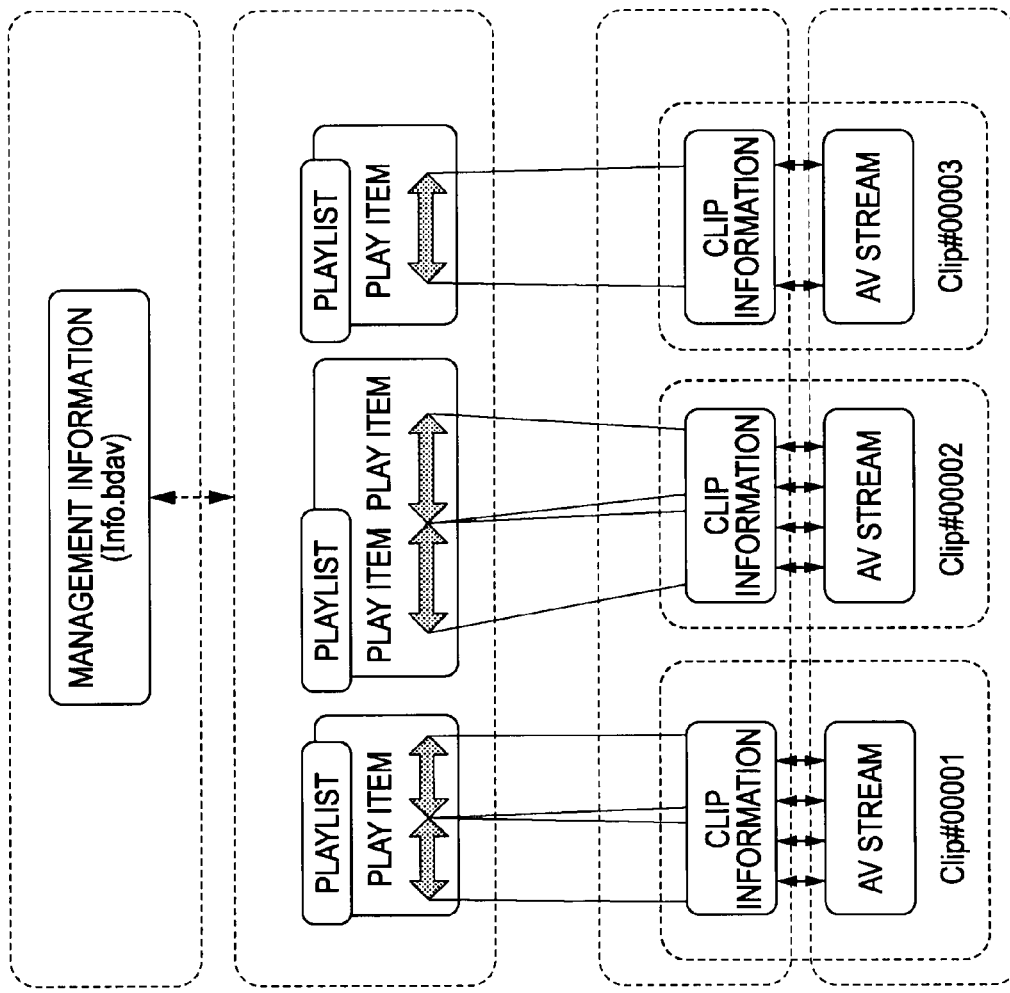
FIG. 8 is diagram to describe the correlation between files set with the BDAV format.

As shown in FIGS. 7 and 8, many of the files specified in the AVCHD format and the files specified in the BDAV format are mostly shared. The stream file (nnnnn.m2ts) storing the actual data of the content is for example MPEG4-AVC stream (e.g. H.264/AVC stream) data of the same format for either AVCHD format or BDAV format, and while conversion is not necessary, other playback control information than this is not all the same, whereby format conversion becomes necessary.

That is to say, of the playback control information in (A) AVCHD format of a (1) index (index.bdmv) file, (2) movie object (MovieObject.bdmv) file, (3) playlist (PlayList) file, and (4) clip information (ClipInformation) file, and of the playback control information in (B) BDAV format (BD-RE2.1) of a (1) management information (info.bdav) file, (2) playlist (PlayList) file, and (3) clip information (ClipInformation) file, the playback control information herein is not the same, thereby necessitating format conversion for the playback control information herein.

Figure 9:
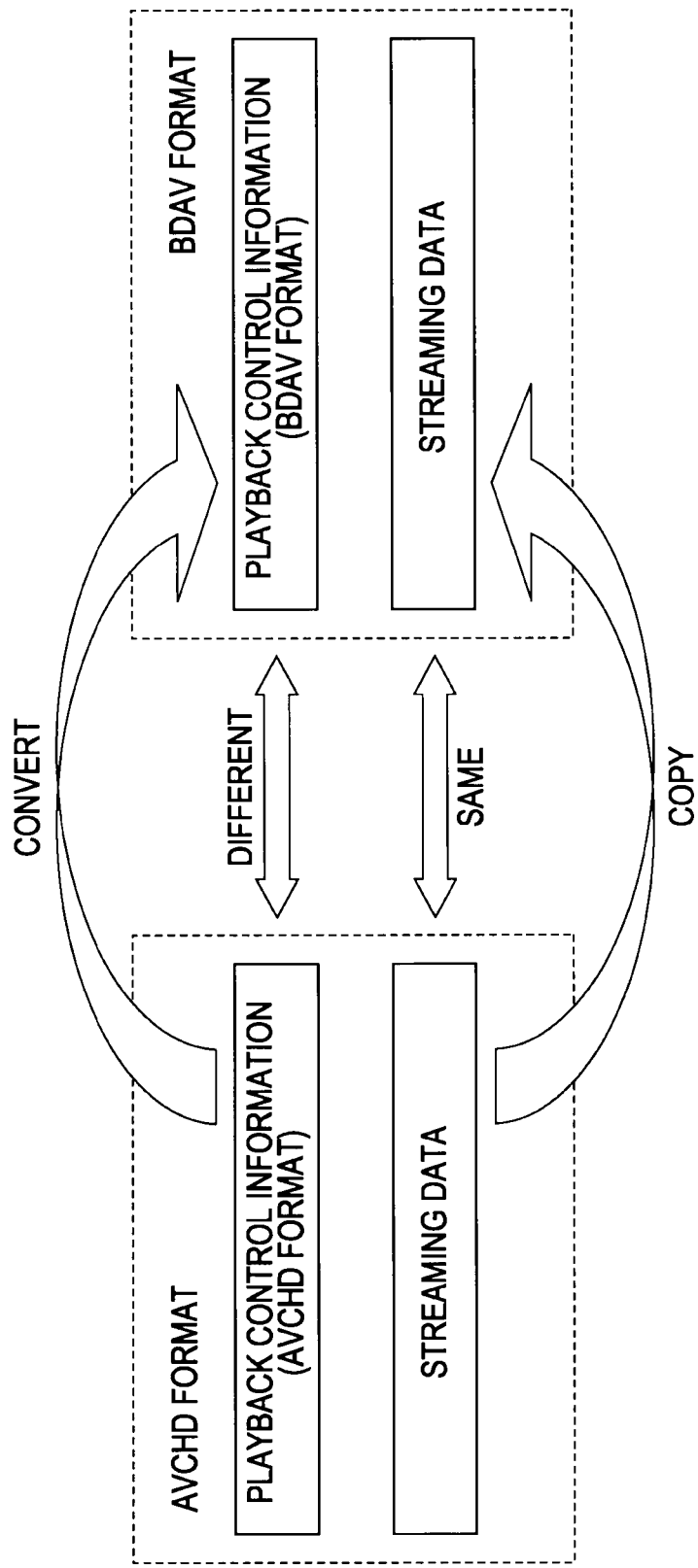
FIG. 9 is a diagram to describe an overview of format conversion processing from AVCHD format to BD format executed with the present invention.

In the case that the clip adjusting unit 123 executes format conversion, as shown in FIG. 9, only the playback control information other than the streaming data is subject to format conversion, and for the streaming data, file copy processing is executed without conversion.

Figure 10:
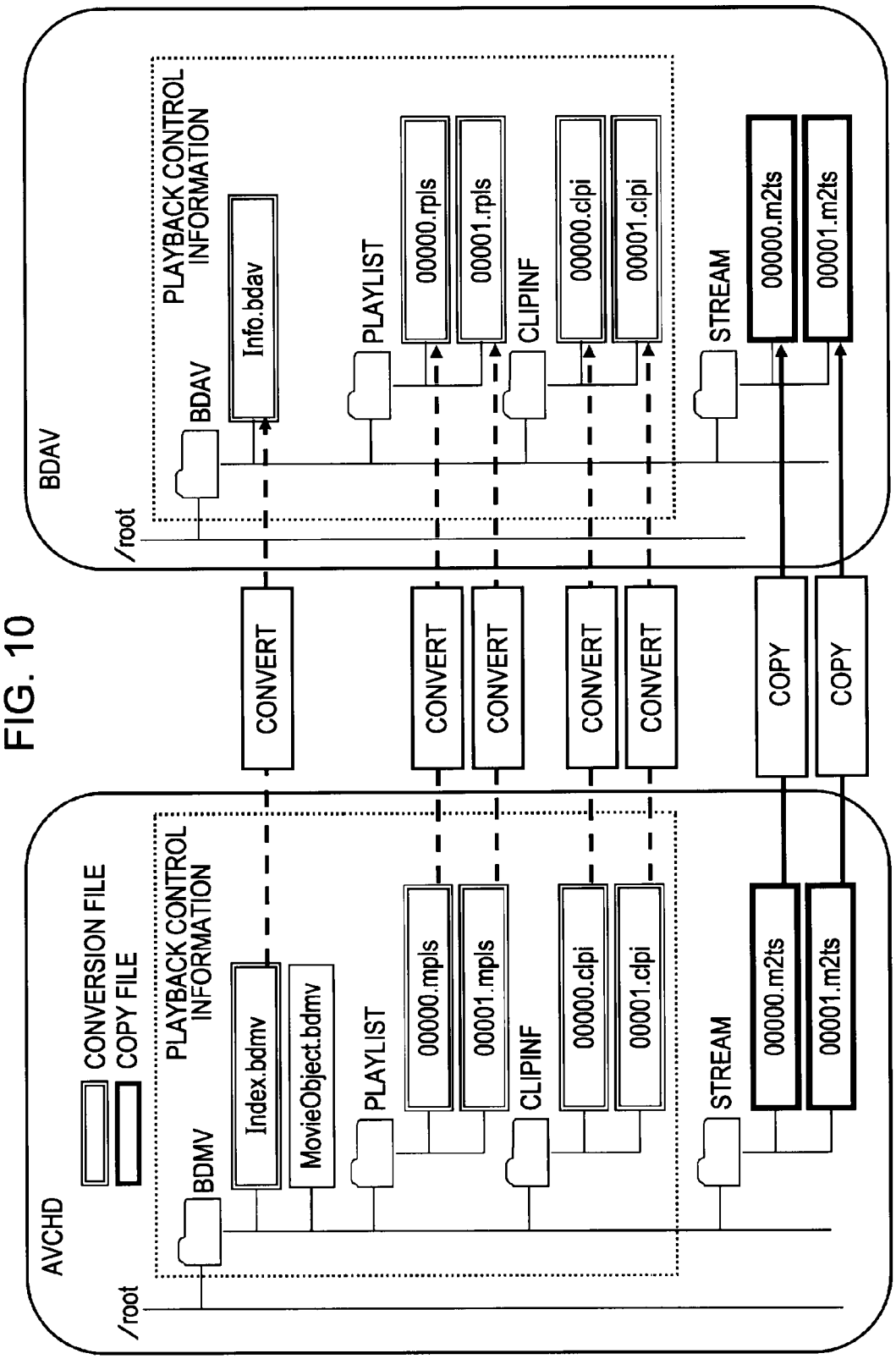
FIG. 10 is a diagram to describe a file subjected to format conversion processing from AVCHD format to BD format executed with the present invention.

FIG. 10 shows a file subject to conversion and a file subject to copying in a directory configuration. With a file set in AVCHD format, the file subject to conversion is a playback control information file of (1) index (Index) file, (2) playlist (PlayList) file, and (3) clip information (ClipInformation) file. Also, a (4) stream (AVStream) file is subject to copy processing without conversion. The movie object file is not used in BDAV format, so neither of conversion and copy processing are performed.

Figure 11:
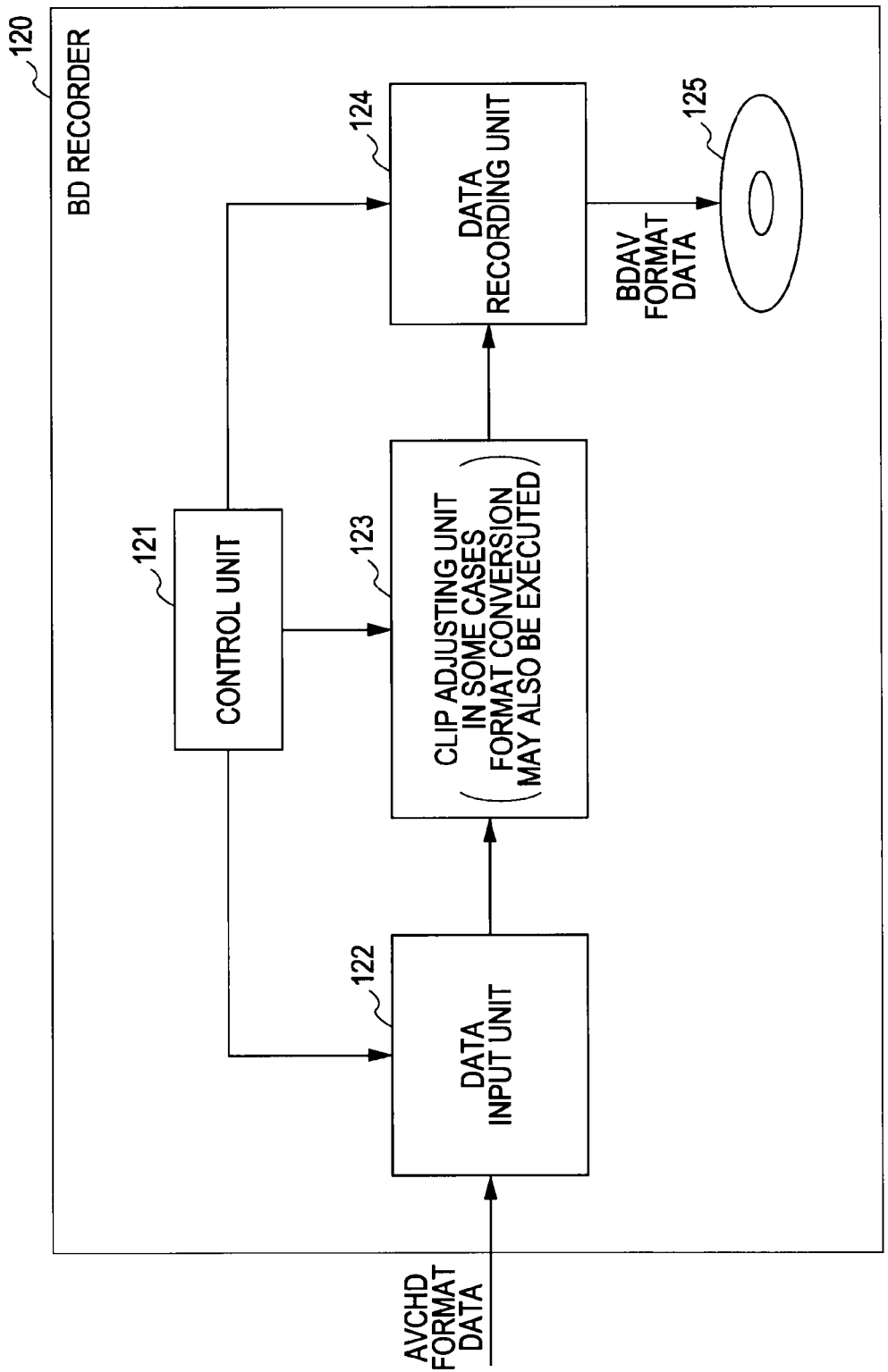
FIG. 11 is a diagram to describe a configuration example of an information processing device which executes clip adjusting processing according to an embodiment of the present invention.

FIG. 11 shows a configuration example of the BD recorder 120 according to an embodiment of the present invention. The BD recorder 120 herein corresponds to the BD recorder 120 shown in FIG. 13. The BD recorder 120 inputs AVCHD format data output from the video camera 110 (see FIG. 13) as copy source data at the data input unit 122.

AVCHD format data which is copy source data input by the data input unit 122 is input into the clip adjusting unit 123, and the clip adjusting unit 123 executes format conversion accompanying clip generating processing. Regarding format conversion, the playback control information, i.e. (1) index (Index) file, (2) playlist (PlayList) file, and (3) clip information (ClipInformation) file are subjected to data conversion processing. The (4) stream (AVStream) file is subjected to copy processing without conversion.

The clip adjusting unit 123 obtains copy source clip configuration data including streaming data subject to copying from the copy source data input from the data input unit 122, and sets one clip including multiple copy source clip configuration data corresponding to the play items in the playlist file defined with the copy source format, as a copy destination clip. In other words, combining processing (merging) of clips is executed.

With the clip combining processing (merging) and conversion processing, copy processing and so forth, the AVCHD format data is converted to BDAV format data and is input into the data recording unit 124. That is to say, the clip adjusting unit 123 generates playback control information serving as playback control information according to BDAV format for a (1) management information (info.bdav) file, (2) playlist (PlayList) file, (3) clip information (ClipInformation) file, and performs copy processing without conversion for a (4) stream (AVStream) file, and outputs this resulting data to the data recording unit 124.

The data recording unit 124 records the BDAV format data onto a media (Blu-ray Disc) 125. Note that the control unit 121 executes control for the series of processing herein. That is to say, data including the copy destination clip set with the clip adjusting unit 123 is recorded on the media. Note that the series of processing here is executed according to a program stored in an unshown memory.

The clip adjusting unit 123 executes clip setting processing in the BD format data so that the number of clips included in AVCHD format data is not increased. A specific example of clip setting processing executed by the clip adjusting unit 123 is described with reference to FIG. 12.

FIG. 12A shows the correlation between the play item and clip in the dubbing source (copy source) media (AVCHD format with the present embodiment), and FIG. 12B shows the correlation between the play item and clip in the dubbing destination (copy destination) media (BDAV format with the present embodiment).

Note that a playlist is one playback sequence that can be specified by the user, and is made up of one or more play items. FIG. 12A shows a playlist including three play items (#0 through #2) which are correlated to the AV stream to be copied.

The example shown in FIG. 12A is an example in the case of dubbing (copying) two clips of clip 1 (Clip1) and clip 2 (Clip2) recorded on the dubbing source (copy source) media. With general copy processing up to this point, as described earlier with reference to FIG. 2, copy processing is executed while setting the clips in increments of play items (Item shown in FIG. 12), and consequently there has been the problem of an increased number of clips in the copy destination media.

With the clip setting processing according to the present invention, clip setting is performed at the copy destination media so as to not increase the number of clips, but rather decrease, at the copy source media. In the example shown in FIG. 12, copy processing is performed in the order of steps 11 through 13 as shown in FIG. 12B.

First, in step 11, the play item #0 (Item #0) of the dubbing source and a partial segment (AB) of the clip 1 (Clip1) correlating to the play item #0 (Item #0) are read out, and the clip segment AB is set and recorded as one clip A (ClipA) independent in the media of the dubbing destination (copy destination).

Next, in step 12, the play item #1 (Item #1) of the dubbing source and a partial segment (BC) of the clip 1 (Clip1) correlating to the play item #1 (Item #1) are read out, and the clip segment BC is added to the clip A (ClipA) generated in step 11. That is to say, the clip data corresponding to the play item #0 (Item #0) of the dubbing source and the clip data corresponding to the play item #0 (Item #0) are set and recorded as the same clip in the copy destination media.

Next, in step 13, the play item #2 (Item #2) of the dubbing source and a clip 2 correlating to the play item #2 (Item #2) are read out, and the clip 2 is added to the clip A (ClipA) generated in step 11. That is to say, the clip data corresponding to the play item #0 (Item #0) through play item #2 (Item #2) of the dubbing source is set and recorded as one same clip in the copy destination media. In this case, even if the clips are set at the copy source as two different clips as clip 1 (Clip1) and clip 2 (Clip2), at the copy destination the clips are set as one clip A (ClipA).

That is to say, even in the case that the multiple copy source clip configuration data is set in the copy source format as difference clips, in the case that the multiple copy source clip configuration data are clip data corresponding to the play items included in the same playlist file in copy source format, the clip adjusting unit 123 performs processing to set one copy destination clip including the multiple copy source clip configuration data.

Thus, with the copy processing according to the present invention, the clips are not set in increments of play items in the dubbing source playlist file, and the clips corresponding to at least play items included in the same playlist, particularly in continuous play items, are set as one clip in the copy destination media and recording is performed.

Consequently, the number of clips in the dubbing source media becomes less than the number of dubbing source clips. In the example shown in FIG. 12, the number of dubbing source clips=2 and the number of dubbing destination clips=1.

Thus, in the case that the multiple copy source clip data is the clip data corresponding to the play items included in the same playlist file in copy source format, the clip adjusting unit 123 sets one copy destination clip including the multiple copy source clip data.

By performing such clip adjusting processing, a large amount of data can be copied (dubbed) while complying with the regulations of the formats wherein the upper limit of number of clips are stipulated. With AVCHD format, the upper limit of number of clips recordable on one recording media is stipulated as 4000 and with BDAV format, the upper limit of number of clips recordable on one recording media is stipulated as 200, but by performing the clip setting processing described with reference to FIG. 12, as shown in FIG. 3 for example, even in the case of reading out the AVCHD format data from the media wherein data is recorded according to AVCHD format, converting to BDAV format data, and performing processing to record onto other media, a large amount of format converted data can be copies while remaining at or below the clip number limit (200) in BDAV format.

Note that as described above, the clip adjusting processing of the present invention is applicable not only to copy processing between media accompanying format conversion as described above, but is also applicable to copy processing between the same format which does not accompany format conversion, e.g. AVCHD to AVCHD or BD to BD format, and is effective for decreasing the number of clips in the copy destination media.

Figure 13:
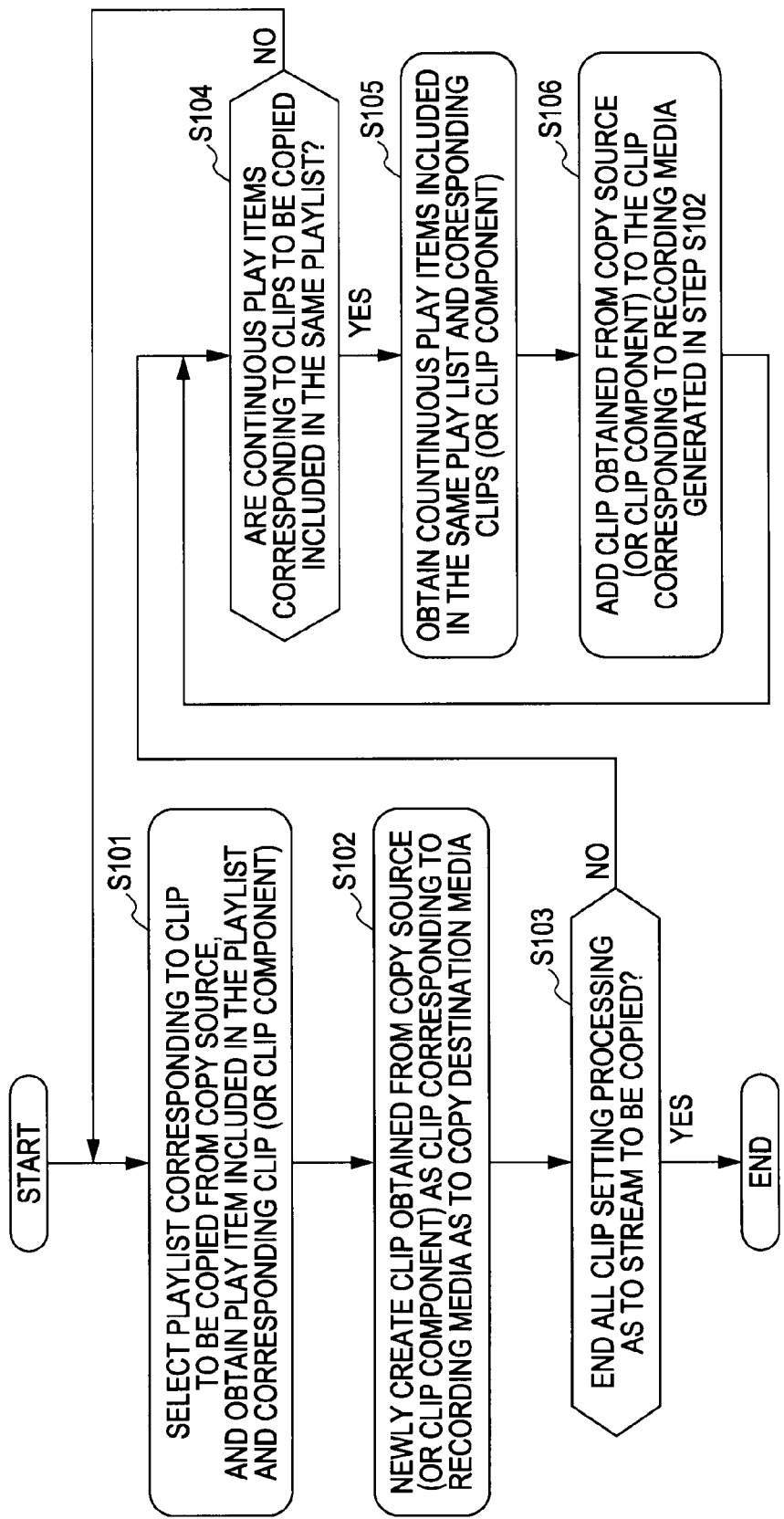
FIG. 13 is a diagram illustrating a flowchart to describe a sequence of a clip adjusting processing according to an embodiment of the present invention.

Next, a sequence of clip setting processing executed by the clip adjusting unit will be described with reference to the flowchart shown in FIG. 13.

First, in step S101, a playlist corresponding to the clip to be copied is selected from the copy source, and a play item included in the playlist and corresponding clip thereto (or clip component) is obtained.

Next, in step S102, the clip (or clip component) obtained from the copy source is newly created as a clip corresponding to recording media as to the copy destination media.

Next, in step S103, determination is made as to whether or not all of the clip setting processing as to the stream to be copied is ended. In the case this is ended, the processing is ended. In the case of any unprocessed clip data, the flow proceeds to step S104.

In step S104, determination is made as to whether continuous play items corresponding to the clip to be copied are included in the same playlist with play items having executed copy processing. In the case that continuous play items are included, the flow proceeds to step S105.

In step S105, the continuous play items included in the same playlist and the corresponding clip (or clip component) are obtained, and in step S106 the clip (or clip component) obtained from the copy source is added to the clip corresponding to the recorded media generated in step S102. This processing corresponds to the processing in steps 12 or 13 described above with reference to FIG. 12B.

On the other hand, in the case that determination is made that continuous play items corresponding to the clip to be copied are not included in the same playlist with play items having executed copy processing in step S104, the flow returns to step S101, a new playlist is obtained corresponding to the next clip to be copied from the copy source media, and the processing in step S101 and thereafter is executed. That is to say, in the case that the playlists differ in the copy source, different clips are set in the copy destination media also in step S102.

As described above, with the clip setting processing according to the present invention, clips corresponding to the play item included in one playlist are created so that the clips are added in order even if the play item is different. With this processing, the number of clips in the copy destination media is not increased more than the number of clips to be copied in the copy source media, and in many cases, the number of clips are decreased and recorded.

Accordingly, even in the case of converting the AVCHD format data stipulated as having an upper limit number of clips in one media of 4000 into the BD format data stipulated as having an upper limit number of clips in one media of 200 and performing copying, a large amount of data can be recorded at or below the upper limit number of clips.

Specific Example of Clip Combining Processing

Figure 14:
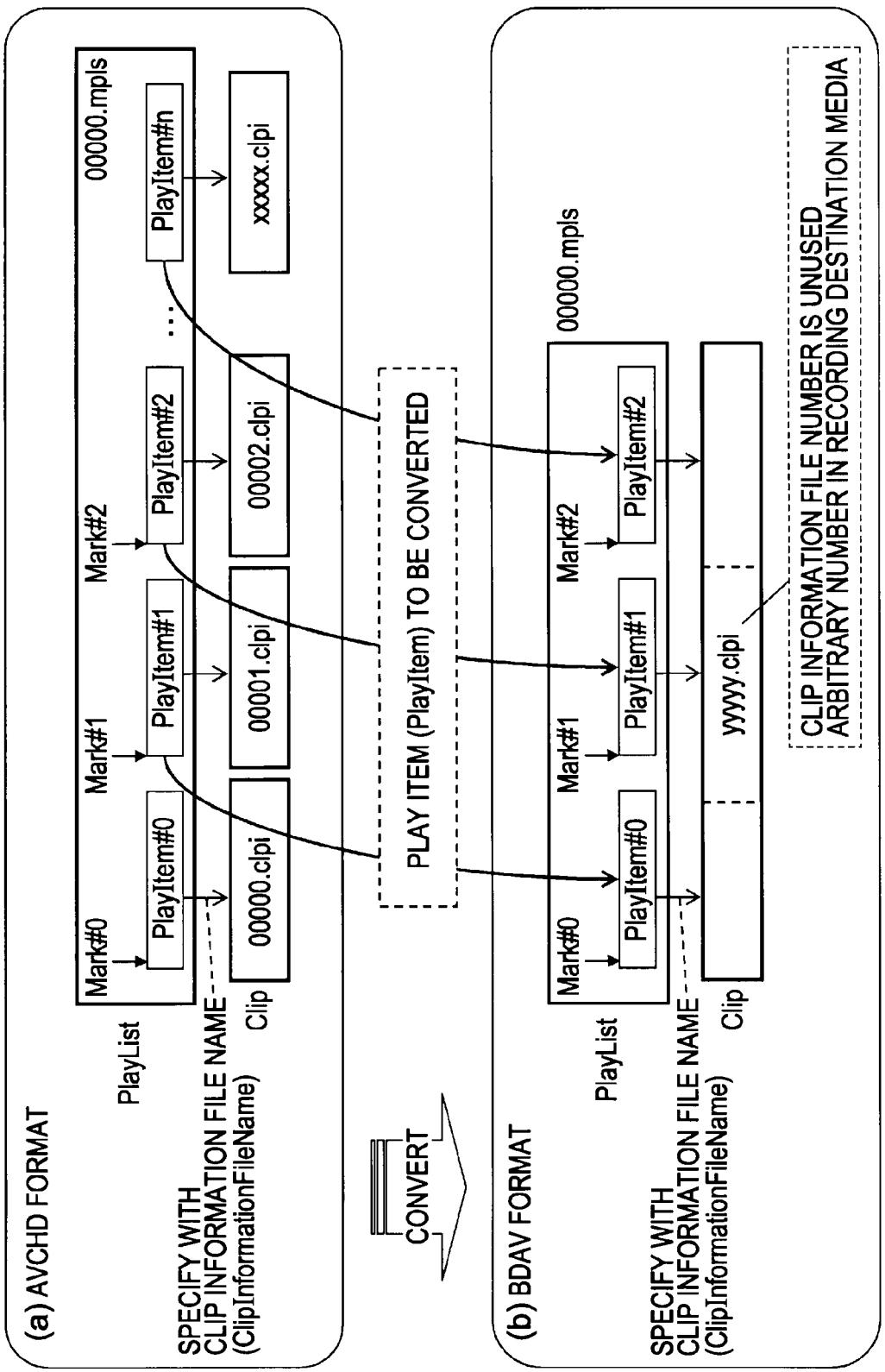
FIG. 14 is a diagram describing a resetting processing example for each identifier with the format conversion processing according to an embodiment of the present invention.

Next, an example of various types of identifier setting processing in the case of performing clip merging processing which accompanies the format conversion to convert AVCHD format data to BDAV format will be described with reference to FIGS. 14 and 15. As described above, the upper limit of the number of clips recordable in one recording media is stipulated as 4000 in AVCHD format, the upper limit of the number of clips recordable in one recording media is stipulated as 200 in BDAV format.

To this end, the combining (merging) processing of clips described above is executed in the event of conversion processing from AVCHD format to BDAV format, and combining multiple clips set in AVCHD format into one clip in BDAV format is performed.

Also, there may be cases wherein selective data conversion processing is performed to accompany editing processing, such as only a portion of data from the AVCHD format data recorded in the video camera media is selected and converted to BDAV format data.

In the case of thus performing format conversion accompanying clip merging, in the event that the clips set in the copy source format data and identifiers (numbers) for play items and so forth are generated as BD format data, performing setting anew is desirable.

Specifically, regarding the identifiers (ID) of (1) clip information file name, (2) play item ID, and (3) STC-ID, the identifiers in AVCHD format data should not be retained, but rather it is desirable that new identifiers are set in the BD format data after format conversion. Note that STC-ID is data region identifier information which assures continuity of time stamps in a clip information file.

The clip adjusting unit 123 performs processing to set new identifiers for the clip information file identifier, play item identifier, and STC identifier with the BDAV format data without using an identifier included in the AVCHD format data.

Specific processing for the identifier setting is as described below. For the clip information file identifier included in the BDAV format data, identifier setting processing is performed to set an identifier not used with the media recording the BDAV format data. Also, for the playlist ID (identifier), processing is performed to set the playlist identifier made up from numerical values incremented one at a time for multiple play items set in one play list included in the BDAV format data. For the STC-ID (identifier), processing is performed to set the STC identifier made up from numerical values incremented one at a time for multiple STC set in one clip information file included in the BDAV format data.

Examples of setting these identifiers will be described with reference to FIGS. 14 and 15. FIG. 14 shows the processing wherein (a) only one portion is selected from multiple play items in the playlist file set in the AVCHD format data and format conversion is executed, and (b) becomes the BDAV format. That is to say, this is format conversion processing accompanying data editing.

Multiple play items are included in one play list of the AVCHD format data of the conversion source data, and ID (identifiers) incremented one at a time from #0 such as #0, #1, #2, #3 . . . #n as play item IDs are set in these play items. Each play item is associated to one of the clip information files which are set corresponding to the AV stream equating to photography data. These are the clip information files [(00000.clpi), (00001.clpi), (00002.clpi), . . . (xxxxx.clpi)] shown in the diagrams. Note that the play items and clips are associated by clip information file name [ClipInformationFileName].

For example in the case of performing format conversion accompanying editing processing, 3 play items included in the playlist of the AVCHD format data, i.e. play item #0 (PlayItem #0), play item #1 (PlayItem #1), play item #n (PlayItem #n), and in the case that the corresponding clips only are selected format conversion executed and recorded, as shown in the lower level (B) BDAV format in the diagram, one clip is set with the clip merging processing. The clip information file name [yyyyy.clpi] corresponding to the one clip is set as a clip information file name not used with the media recording the data after format conversion, as described above.

Further, a play item subjected to conversion processing is set in the playlist after format conversion set with the BDAV format, but this identifier is not set as identifier [#1, #2, #n] which had been used in AVCHD format, but is newly set as [#0, #1, #2]. Thus the identifiers of the play items set in the playlist generated in BDAV format do not continue the play item identifiers [#1, #2, #n] which had been used in AVCHD format, but are newly set.

FIG. 15 is a diagram describing a specific example of setting processing of reference STC-ID (identifier) [ref_to_STC_id] accompanying the format conversion. Also with the STC sequence [STC_Sequence] set in the clip information file and program sequence [ProgramSequence] identifier (ID) in the case of merging the multiple AVCHD clips into one BDAV clip, the identifiers in AVCHD format are not used as is with the BDAV format data, but as shown in the diagram, are newly set so as to be incremented one at a time, as #0, #1, #2 . . . . By performing such setting, the playback processing with a BD player can be correctly executed.

Note that with the above-described embodiment, description is given such that the clip adjusting unit is set in the data recording device that performs the data recording processing shown in FIG. 11, but as described with reference to FIG. 4 earlier, the clip adjusting processing and format converting may be arranged to be executed with other than the recording device. That is to say, the format conversion processing may be a configuration of any of (a) configuration to set the clip adjusting processing unit on the recording device side, (b) configuration to set the clip adjusting processing unit on the playback device side, and (c) configuration to set an independent clip adjusting device. The clip adjusting processing according to the present invention can be executed with various devices.

For example, in the case that the clip adjusting processing unit is configured in the data playback device such as a video camera, the configuration of the data playback device has a configuration as described below.

The data playback device includes a data playback unit arranged to execute data playback from media wherein clip defined format data is recorded; a clip adjusting unit arranged to obtain copy source clip configuration data including the streaming data to be copied from the playback data of the data playback unit, and sets one clip including multiple copy source clip configuration data corresponding to the play items in the playlist file defined by the copy source format, as the copy destination clip; and a data output unit to output the data including the copy destination clip set with the clip setting step as data to be copied.

Note that as described above, the present invention is applicable to all of the cases described below, i.e.

(a) in the case of recording when the copy source and copy destination are both the same format data, e.g. in the case of reading BD format data from the copy source and recording this as BD format data at the copy destination;

(b) in the case of recording when the copy source and copy destination are both the same format data, e.g. in the case of reading AVCHD format data from the copy source and recording this as AVCHD format data at the copy destination.

(c) in the case of executing format conversion where the copy source and copy destination have difference format data, e.g. AVCHD format data and BD format data, and performing copying. Further, the present invention is applicable in the case of changing formats between multiple different format, such as between AVCHD formats or between BD formats, e.g. between BD-RE3.0 format and BD-RE-2.1 format.

The present invention has been described in detail above with reference to specific embodiments. However, it should be clear that one skilled in the art can make corrections and modifications insofar as they are within the scope of the present invention. That is to say, the present invention is disclosed herein in embodiments as an exemplification, and is not to be interpreted in a restrictive manner. In order to determine the essence of the present invention, the Claims should be referred to.

Also, the series of processing described in the specification may be executed with hardware, software, or a combined configuration of both. In the case of executing processing with software, a program having in which is described the processing sequence is installed in memory in a computer built into dedicated hardware to execute, or is installed in a general-use computer wherein various types of processing can be executed, so as to be executed. For example, a program can be recorded beforehand in a recording medium. Other than installing from a recording medium to a computer, the program can be received via a network such as a LAN (Local Area Network) or the Internet, and can be installed in a storage medium such as an internal hard disk.

Note that the various types of processing described in the specification are not limited to execution in time series according to the description; rather, according to processing capability of the device to execute the processing, or as necessary, the processing can be executed in parallel or individually. Also, "system" as used in the present specification is a theoretical collective configuration of multiple devices, and is not limited to devices of various configurations being housed in the same casing.

As described above, according to a configuration of an embodiment of the present invention, with a configuration to generate data for copying of clip defined format data including playback segment data, copy source clip configuration data including streaming data to be copied is obtained, and clip adjusting processing is performed to set one clip including multiple copy source clip configuration data which are set in the playlist file in the copy source format, as the copy destination clip. With the present configuration, copy recording can be performed without increasing the number of copy destination clips to be larger than the number of copy source clips. Accordingly, various types of formats wherein the upper limit of number of clips recordable onto media is stipulated, e.g. in the event of copy recording processing with AVCHD format or BDAV format, recording a large amount of data without exceeding the upper limit of number of clips stipulated by the format is enabled.

It should be understood by those skilled in the art that various modifications, combinations, sub-combinations and alterations may occur depending on design requirements and other factors insofar as they are within the scope of the appended claims or the equivalents thereof.

What is claimed is:

1. A data conversion method for an information processing device for copying of data from a copy source defined by a source format to a copy destination defined by a destination format, the method comprising:

performing data input, by a data input circuit, to input copy source data, the copy source data including a plurality of source clips;

obtaining source playback control information from the copy source data, the source playback control information including at least one source playlist file made up of one or more play items indicating playback segment increments for the plurality of source clips; and performing clip setting, by a clip setting circuit, by setting source clips, of the plurality of source clips, included in a single source playlist file, of the one or more playlist files included in the obtained source playback control information, to a single destination clip, wherein the source clips, of the plurality of source clips, corresponding to continuous play items included in the source playlist, are set as one clip in the copy destination media, following the clip setting, a number of the source playlist files equals a number of the destination clips, the source format is different than the destination format, when performing clip setting, the plurality of source clips is set to the one destination clip in the corresponding destination format, and the source format is AVCHD (Advanced Video Codec High Definition) and the destination format is BDAV (Blu-ray Disc Audio Visual).

2. The data conversion method according to claim 1, the method further comprising:

performing data recording for a data recording circuit such that the destination clip is recorded to a destination medium.

3. The data conversion method according to claim 1, wherein the format conversion between the source and destination formats includes:

executing processing to
select a source index file, the source playlist file, and a source clip information file from the source playback control information in the AVCHD format, and generate destination playback control information including a destination playlist file and a destination clip information file according to the BDAV format, by format conversion of the copy source data.

4. The data conversion method according to claim 1, wherein the format conversion between the source and destination formats includes setting new identifiers for the BDAV format data without using the identifiers in the AVCHD format data, the identifiers including clip information file identifiers, play item identifiers, and STC identifiers.

5. The data conversion method according to claim 1, wherein the source clips and the destination clips each include a stream file in which moving image data is stored and a clip information file in which attribute information of the stream file is stored.

6. The data conversion method according to claim 5, wherein when clip setting is performed, the clip setting circuit copies the stream file stored in the source clip to the copy destination.

7. The data conversion method according to claim 6, wherein the stream file does not change formats when copied to the copy destination.

8. The data conversion method of claim 1, wherein when there are greater than 200 clips included in the plurality of source clips, the clip setting circuit converts the source playback control information such that less than or equal to 200 clips are copied to the copy destination.

9. The data conversion method of claim 8, wherein the greater than 200 clips included in the plurality of source clips and the less than or equal to 200 clips copied to the copy destination both represent a common predetermined amount of streaming data.

10. The data conversion method of claim 9, wherein the predetermined amount of streaming data is unchanged following the clip setting.

11. A data converting device configured to generate data for copying of data from a copy source defined by a source format to a copy destination defined by a destination format, the device comprising:
    a data input circuit configured to input copy source data, the copy source data including a plurality of source clips; and
    a clip adjusting circuit configured to
        obtain source playback control information from the copy source data, the source playback control information including at least one source playlist file made up of one or more play items indicating playback segment increments for the plurality of source clips, and
        set source clips, of the plurality of source clips, included in a single source playlist file, of the one or more playlist files included in the obtained source playback control information, to a single destination clip, wherein
        the source clips, of the plurality of source clips, corresponding to continuous play items included in the source playlist, are set as one clip in the copy destination media, and
        following the clip setting, a number of the source playlist files equals a number of the destination clips,
        the source format is different than the destination format,
        when performing clip setting, the plurality of source clips is set to the one destination clip in the corresponding destination format, and
        the source format is AVCHD (Advanced Video Codec High Definition) and the destination format is BDAV (Blu-ray Disc Audio Visual).

12. The data converting device according to claim 11, wherein the source clips and the destination clips each include a stream file wherein moving image data is stored and a clip information file wherein attribute information of the stream file is stored.

13. The data converting device according to claim 12, wherein when setting the source clips corresponding to play items in the same source playlist file to the single destination clip, the clip setting circuit copies the stream file stored in the source clip to the copy destination.

14. The data converting device according to claim 13, wherein the stream file does not change formats when copied to the copy destination.

15. A data recording device configured to execute copy recording processing of clip defined format data including playback segment data, said device comprising:
    a data input circuit configured to input copy source data, the copy source data including a plurality of source clips; and
    a clip adjusting circuit configured to
        obtain source playback control information from the copy source data, the source playback control information including at least one source playlist file made up of one or more play items indicating playback segment increments for the plurality of source clips, and
        set source clips, of the plurality of source clips, included in a single source playlist file, of the one or more playlist files included in the source playback control information, to a single destination clip, wherein
        the source clips, of the plurality of source clips, corresponding to continuous play items included in the source playlist, are set as one clip in the copy destination media, and
        following the clip setting, a number of the source playlist files equals a number of the destination clips,
        the source format is different than the destination format,
        when performing clip setting, the plurality of source clips is set to the one destination clip in the corresponding destination format, and
        the source format is AVCHD (Advanced Video Codec High Definition) and the destination format is BDAV (Blu-ray Disc Audio Visual); and
    a data recording circuit configured to record the generated destination playback control information to a destination media.

16. A data playback device configured to play back clip defined format data including playback segment data from a source media and output the data to be copied, said device comprising:
    a data playback circuit to execute data playback from the source media wherein copy source data is recorded;
    a clip adjusting circuit configured to
        obtain source playback control information from the copy source data, the source playback control information including at least one source playlist file made up of one or more play items indicating playback segment increments for the plurality of source clips, and
        set source clips, of the plurality of source clips, included in a single source playlist file, of the one or more playlist files included in the obtained source playback control information, to a single destination clip, wherein the source clips, of the plurality of source clips, corresponding to continuous play items included in the source playlist, are set as one clip in the copy destination media, and following the clip setting, a number of the source playlist files equals a number of the destination clips, the source format is different than the destination format, when performing clip setting, the plurality of source clips is set to the one destination clip in the corresponding destination format, and the source format is AVCHD (Advanced Video Codec High Definition) and the destination format is BDAV (Blu-ray Disc Audio Visual); and a data output circuit configured to output the destination clip to a destination media as data for copying.

17. A non-transitory computer readable medium having instructions stored therein that when executed by a processing circuit causes the processing circuit to execute copy processing of clip defined format data including playback segment data, said copy processing comprising:

inputting copy source data from a copy source, the copy source data including a plurality of source clips;

obtaining source playback control information from the copy source data, the source playback control information including at least one source playlist file made up of one or more play items indicating playback segment increments for the plurality of source clips;

performing clip setting by setting source clips, of the plurality of source clips, included in a single source playlist file, of the one or more playlist files included in the source playback control information, to a single destination clip, wherein the clips, of the plurality of source clips, corresponding to continuous play items included in the source playlist, are set as one clip in the copy destination media, and following the clip setting, a number of the source playlist files equals a number of the destination clips, the source format is different than the destination format, when performing clip setting, the plurality of source clips is set to the one destination clip in the corresponding destination format, and the source format is AVCHD (Advanced Video Codec High Definition) and the destination format is BDAV (Blu-ray Disc Audio Visual); and performing data recording such that the generated destination playback control information is recorded to a destination medium.

* * * * *